US011905397B2

(12) United States Patent
Tuberquia et al.

(10) Patent No.: US 11,905,397 B2
(45) Date of Patent: Feb. 20, 2024

(54) COMPOSITIONS CONTAINING ETHYLENE-BASED POLYMER AND CYCLOOLEFIN INTERPOLYMER, AND FILMS FORMED FROM THE SAME

(71) Applicant: Dow Global Technologies LLC, Midland, MI (US)

(72) Inventors: Juan C. Tuberquia, Manvel, TX (US); Karla M. Sperati, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 47 days.

(21) Appl. No.: 16/639,675

(22) PCT Filed: Aug. 22, 2018

(86) PCT No.: PCT/US2018/047445
§ 371 (c)(1),
(2) Date: Feb. 17, 2020

(87) PCT Pub. No.: WO2019/040574
PCT Pub. Date: Feb. 28, 2019

(65) Prior Publication Data
US 2020/0255640 A1 Aug. 13, 2020

Related U.S. Application Data

(60) Provisional application No. 62/549,147, filed on Aug. 23, 2017.

(51) Int. Cl.
*B32B 27/32* (2006.01)
*C08L 23/08* (2006.01)

(52) U.S. Cl.
CPC .......... *C08L 23/0823* (2013.01); *B32B 27/32* (2013.01); *B32B 27/325* (2013.01); *B32B 2250/05* (2013.01); *B32B 2250/242* (2013.01); *C08L 2203/16* (2013.01)

(58) Field of Classification Search
CPC .................................................. C08L 23/0823
See application file for complete search history.

(56) References Cited

U.S. PATENT DOCUMENTS

| | | | |
|---|---|---|---|
| 4,918,133 A | 4/1990 | Moriya et al. | |
| 5,942,587 A * | 8/1999 | Arjunan | C08L 23/0815 526/348.3 |
| 6,090,888 A | 7/2000 | Khanarian et al. | |
| 6,111,019 A * | 8/2000 | Arjunan | C08J 5/18 525/211 |
| 6,255,396 B1 * | 7/2001 | Ding | C08L 45/00 525/240 |
| 6,984,442 B2 | 1/2006 | Brebion et al. | |
| 7,288,316 B2 | 10/2007 | Jester | |
| 8,663,810 B2 | 3/2014 | Ambroise et al. | |
| 9,050,243 B2 | 6/2015 | Nakamura et al. | |
| 9,452,593 B2 | 9/2016 | Tatarka et al. | |
| 2005/0214557 A1 * | 9/2005 | Arthurs | B32B 27/08 428/516 |
| 2006/0005741 A1 | 1/2006 | Yamazaki et al. | |
| 2008/0274307 A1 * | 11/2008 | Chereau | B32B 27/065 428/17 |
| 2008/0299370 A1 * | 12/2008 | Briggs | B32B 27/34 428/220 |
| 2009/0116768 A1 * | 5/2009 | Huerta | B32B 27/308 383/207 |
| 2011/0212338 A1 | 9/2011 | Ambroise | |
| 2012/0258326 A1 | 10/2012 | Pham et al. | |
| 2014/0170379 A1 | 6/2014 | Manabe et al. | |
| 2014/0170742 A1 | 6/2014 | Smith | |
| 2014/0205835 A1 * | 7/2014 | Taya | C09J 7/241 428/354 |
| 2014/0308466 A1 | 10/2014 | Kashima et al. | |
| 2014/0363600 A1 | 12/2014 | Dooley et al. | |
| 2015/0282978 A1 | 10/2015 | Henderson | |
| 2015/0336652 A1 | 11/2015 | Smith et al. | |
| 2016/0136934 A1 | 5/2016 | Mitchell et al. | |
| 2016/0136935 A1 | 5/2016 | Mitchell et al. | |
| 2016/0244229 A1 | 8/2016 | Lai et al. | |
| 2016/0303833 A1 | 10/2016 | Wang et al. | |
| 2016/0326353 A1 * | 11/2016 | Prades | C08J 5/00 |
| 2017/0283567 A1 * | 10/2017 | Bilgen | B65D 65/38 |

FOREIGN PATENT DOCUMENTS

| | | |
|---|---|---|
| CA | 2170042 A1 | 3/1995 |
| CA | 2269672 A1 | 6/1998 |
| CA | 2410483 C | 8/2009 |
| EP | 0717759 A1 | 6/1996 |

(Continued)

OTHER PUBLICATIONS

AFFINITY PF 1140G flyer (Year: 2005).*
TOPAS 8007 flyer (Year: NA).*
WO2016/094155 (Year: 2016).*
Choi, S.Y. et al., Material- and feature—dependent effects on cell adhesion to micro injection moulded medical polymers. Colloids and Surfaces B-Biointerfaces 2016, vol. 145, p. 46-54.
Khonakdar, H. A.; et al., Miscibility analysis, viscoelastic properties and morphology of cyclic olefin copolymer/polyolefin elastomer (COC/POE) blends. Composites Part B: Engineering 2015, vol. 69, p. 111-119.
www.Topas.Com: "Topas Packaging", Apr. 1, 2011, pp. 1-32, XP055523781, Retrieved from the Internet: <URL:https://topas.com/sites/default/files/files/Packaging_E_2014-06.pdf> [retrieved on Nov. 14, 2018].

(Continued)

*Primary Examiner* — Irina Krylova

(57) ABSTRACT

A composition comprising at least the following components: A) an ethylene-based polymer; B) a cycloolefin inter-polymer comprising, in polymerized form, ethylene and at least one bridged cyclic olefin selected from Structures a-d, as described herein, or any combination of Structures a-d; and wherein component A is present in an amount ≥50 wt %, based on the weight of the composition, and wherein component B is present in an amount from 5 to 12 wt %, based on the sum weight of components A and B.

5 Claims, 3 Drawing Sheets

(56) References Cited

FOREIGN PATENT DOCUMENTS

| | | |
|---|---|---|
| EP | 0742248 A1 | 11/1996 |
| EP | 0827978 A1 | 3/1998 |
| EP | 1300238 A2 | 4/2003 |
| EP | 1525092 A2 | 4/2005 |
| EP | 3016865 A1 | 5/2016 |
| JP | 2001505610 A | 4/2001 |
| JP | 05983850 | 6/2017 |
| KR | 20000057382 A | 9/2000 |
| WO | 2001070497 A2 | 9/2001 |
| WO | 2003097355 A1 | 11/2003 |
| WO | 2008137285 A1 | 11/2008 |
| WO | 2011129869 A1 | 10/2011 |
| WO | 2015004311 A1 | 1/2015 |
| WO | 2016094155 A1 | 6/2016 |
| WO | 2017106120 A2 | 6/2017 |
| WO | 2016152248 | 4/2018 |

OTHER PUBLICATIONS

"3.1.1 Mechanical properties of blends",; "3.1.2 Thermal properties";; p. 8; figures 1, 2; "4.2 Cast film extrusion of TOPAS/PE; blends" to "4.6 Additives";; p. 14-p. 16; table 5; "5.3 Sealing";; p. 20; figure 12.

PCT/US2018/047445, International Search Report and Written Opinion dated Nov. 26, 2018.

PCT/US2018/047445, International Preliminary Report on Patentability dated Feb. 25, 2020.

Office Action from corresponding Japanese Application: 2020-510562 dated Feb. 28, 2023.

* cited by examiner

COMPOSITIONS CONTAINING ETHYLENE-BASED POLYMER AND CYCLOOLEFIN INTERPOLYMER, AND FILMS FORMED FROM THE SAME

REFERENCE TO RELATED APPLICATIONS

This application claims the benefit of U.S. Provisional Application No. 62/549,147, filed Aug. 23, 2017.

BACKGROUND

There is a need for compositions that can be used to form films that can be used to form wrap or bags, and which do not need to be stripped off from the enclosed material (for example, polymer pellets) during the mixing of the enclosed material. As a result, the film gets incorporated and dispersed during the mixing process. The films should also possess enough stiffness and heat seal strength for proper use in industrial scale bagging lines.

Polymer compositions and/or films are described in the following references: WO2003097355, WO2011129869, WO2015004311, WO2008137285, EP1525092A1, EP3016865A1, EP2744648A1, EP717759A1, US2006005741, US20140308466, US20140363600, US20140170742, US20140170379, US20150336652, US20150282978, US20160303833, US20160136934, US20160244229, U.S. Pat. Nos. 4,918,133, 6,090,888, 6,984,442, 7,288,316, 8,663,810, 9,050,243, 9,452,593, CN104943309A (abstract), KR2000057382A (abstract), CA2269672A, CA2410483C, CA2170042A1 and JP2001505610A (abstract). However, as discussed above, there remains a need for compositions to be used in films that have good stiffness and flowability, and can be used for wrap or bags that do not need to be stripped off from the enclosed material, when mixing the enclosed material. These needs have been met by the following invention.

SUMMARY OF INVENTION

A composition comprising at least the following components:
A) an ethylene-based polymer;
B) a cycloolefin interpolymer comprising, in polymerized form, ethylene and at least one bridged cyclic olefin selected from the following:
a)

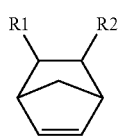

Structure a, wherein R1 and R2 are each, independently, selected from hydrogen, an alkyl;
b)

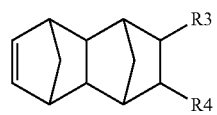

Structure b, wherein R3 and R4 are each, independently, selected from hydrogen, an alkyl;
c)

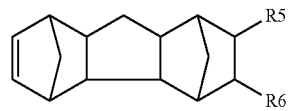

Structure c, wherein R5 and R6 are each, independently, selected from hydrogen, an alkyl;
d)

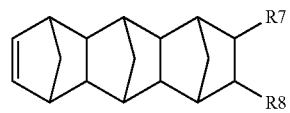

Structure d, wherein R7 and R8 are each, independently, selected from hydrogen, an alkyl;
e) or any combination of a) through d); and wherein component A is present in an amount ≥50 wt %, based on the weight of the composition, and wherein component B is present in an amount from 5 to 12 wt %, based on the sum weight of components A and B.

DETAILED RESCRIPTION

Figure 1:
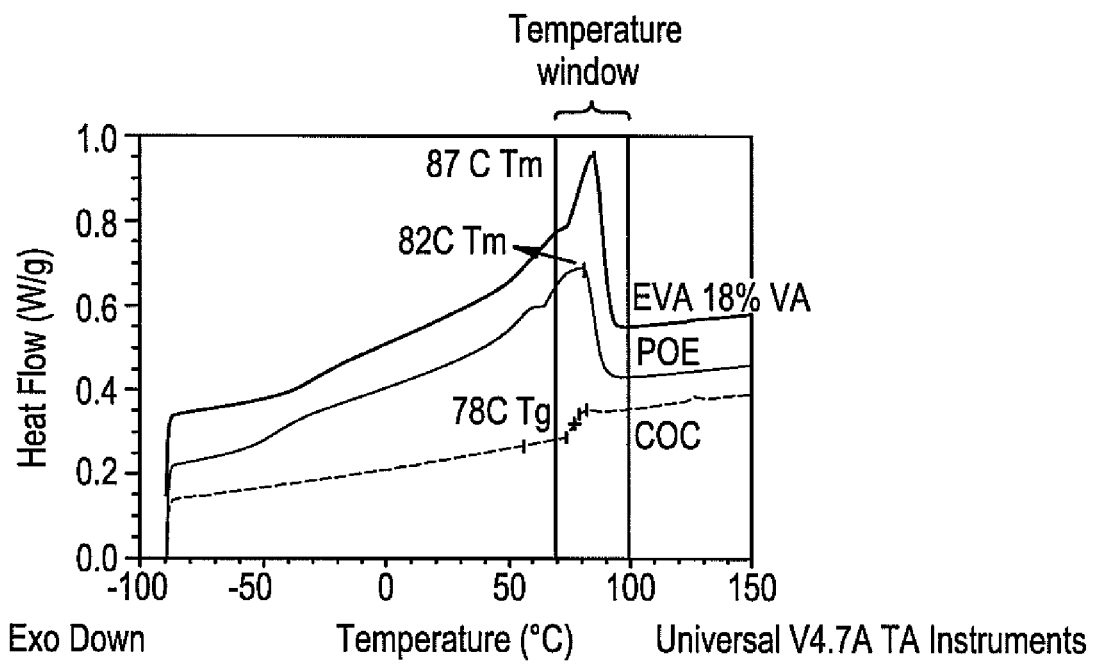
FIG. 1 shows DSC profiles for an EVA, a POE, and a high stiffness polymer (COC) with material transitions in the range from 70° C. to 100° C.

Compositions have been discovered that can be used to form films that have an optimal balance of melting temperature, stiffness and seal strength. Such films can be used to form wrap or bags for polymer materials, such as EPDM pellets, and such films do not need to be stripped off from the enclosed polymer. Such films have low melting temperatures, and are incorporated and dispersed during the mixing process of the enclosed polymer. These films also possess enough stiffness and heat seal strength for proper use in industrial scale bagging lines.

As discussed above, a composition is provided, comprising at least the following components:
A) an ethylene-based polymer;
B) a cycloolefin interpolymer comprising, in polymerized form, ethylene and at least one bridged cyclic olefin selected from the following:
a)

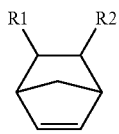

Structure a, wherein R1 and R2 are each, independently, selected from hydrogen, an alkyl (linear or branched or cyclic), further R1 and R2 are each, independently, selected from hydrogen or a C1-C6 alkyl, or hydrogen or a C1-C5 alkyl, or hydrogen or a C1-C4 alkyl, or hydrogen or a C1-C3 alkyl, or hydrogen or a C1-C2 alkyl, or hydrogen or methyl, or hydrogen;
b)

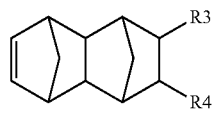

Structure b, wherein R3 and R4 are each, independently, selected from hydrogen, an alkyl (linear or branched or cyclic), further R3 and R4 are each, independently, selected from hydrogen or a C1-C6 alkyl, or hydrogen or a C1-C5 alkyl, or hydrogen or a C1-C4 alkyl, or hydrogen or a C1-C3 alkyl, or hydrogen or a C1-C2 alkyl, or hydrogen or methyl, or hydrogen;
c)

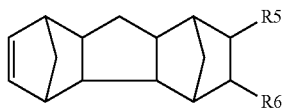

Structure c, wherein R5 and R6 are each, independently, selected from hydrogen, an alkyl (linear or branched or cyclic), further R5 and R6 are each, independently, selected from hydrogen or a C1-C6 alkyl, or hydrogen or a C1-C5 alkyl, or hydrogen or a C1-C4 alkyl, or hydrogen or a C1-C3 alkyl, or hydrogen or a C1-C2 alkyl, or hydrogen or methyl, or hydrogen;
d)

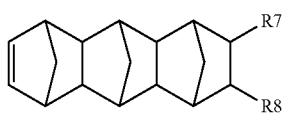

Structure d, wherein R7 and R8 are each, independently, selected from hydrogen, an alkyl (linear or branched or cyclic), further R7 and R8 are each, independently, selected from hydrogen or a C1-C6 alkyl, or hydrogen or a C1-C5 alkyl, or hydrogen or a C1-C4 alkyl, or hydrogen or a C1-C3 alkyl, or hydrogen or a C1-C2 alkyl, or hydrogen or methyl, or hydrogen;

e) or any combination of a) through d); and wherein component A is present in an amount ≥50 wt %, based on the weight of the composition, and wherein component B is present in an amount from 5 to 12 wt %, based on the sum weight of components A and B.

The composition may comprise a combination of two or more embodiments described herein. Each component of the composition may comprise a combination of two or more embodiments described herein.

In one embodiment, the cycloolefin interpolymer of component B has a Tg from 60° C. to 90° C., or from 65° C. to 90° C.

In one embodiment, the ethylene-based polymer of component A has a Tm from 70° C. to 95° C., or from 85° C. to 90° C.

In one embodiment, the ethylene-based polymer of component A has a density ≤0.900 g/cc, or ≤0.890 g/cc, or ≤0.885 g/cc, or ≤0.880 g/cc (1 cc=1 cm$^3$).

In one embodiment, the ratio of the Tg of component B to the Tg of component A is from −1.0 to −5.0, or from −1.1 to −4.5, or from −1.1 to −4.0, or from −1.1 to −3.5, or from −1.1 to −3.0, or from −1.1 to −2.5.

In one embodiment, component B is present in an amount from 5 to 12 wt %, or from 5 to 11 wt %, or from 5 to 10 wt %, based on the sum weight of components A and B.

In one embodiment, component B is present in an amount from 5 to 12 wt %, or from 5 to 11 wt %, or from 5 to 10 wt %, based on the weight of the composition.

In one embodiment, the weight ratio of component A to component B is from 4.0 to 20.0, or from 5.0 to 20.0, or from 5.0 to 15.0, or from 7.0 to 11.0, or from 8.0 to 10.0.

In one embodiment, the ethylene-based polymer of component A is an ethylene/alpha-olefin interpolymer, or an ethylene/alpha-olefin copolymer, or an ethylene/C3-C8 α-olefin copolymer.

In one embodiment, the ethylene-based polymer of component A is an ethylene/alpha-olefin/diene interpolymer, and further an ethylene/propylene/diene terpolymer (EPDM). In a further embodiment, the diene is ENB.

In one embodiment, the ethylene-based polymer of component A is an ethylene-vinyl acetate (EVA) copolymer.

In one embodiment, component A is present in an amount ≥55 wt %, or ≥60 wt %, or ≥65 wt %, or ≥70 wt %, or ≥75 wt %, or ≥80 wt %, or ≥85 wt %, or ≥84 wt % based on the weight of the composition. In one embodiment, component A is present in an amount ≤95 wt %, or ≤94 wt %, or ≤93 wt %, or ≤92 wt %, or ≤91 wt %, or ≤90 wt %, based on the weight of the composition.

In one embodiment, the composition comprises ≥80 wt %, or ≥85 wt %, or ≥90 wt %, or ≥95 wt %, or ≥98 wt % of the sum of component A and component B, based on the weight of the composition. In one embodiment, the composition comprises ≤100 wt %, or ≤99 wt % of the sum of component A and component B, based on the weight of the composition.

In one embodiment, the composition comprises less than 1.0 wt %, or less than 0.5 wt % of a polymer comprising, in polymerized form, styrene, and optionally, one or more other comonomers.

In one embodiment, the cycloolefin interpolymer is an ethylene/bridged cyclic olefin copolymer.

In one embodiment, the at least one bridged cyclic olefin selected from the following:
a)

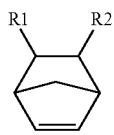

Structure a, wherein R1 and R2 are each, independently, selected from hydrogen, an alkyl (linear or branched or cyclic). In a further embodiment, R1 and R2 are each, independently, selected from hydrogen or a C1-C6 alkyl, and further hydrogen or a C1-C5 alkyl, or hydrogen or a C1-C4 alkyl, or hydrogen or a C1-C3 alkyl, or hydrogen or a C1-C2 alkyl, or hydrogen or methyl, or hydrogen.

In one embodiment, the at least one bridged cyclic olefin selected from the following:
b)

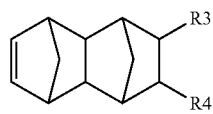

Structure b, wherein R3 and R4 are each, independently, selected from hydrogen, an alkyl (linear or branched or cyclic). In a further embodiment, R1 and R2 are each, independently, selected from hydrogen or a C1-C6 alkyl, and further hydrogen or a C1-C5 alkyl, or hydrogen or a C 1-C4 alkyl, or hydrogen or a C 1-C3 alkyl, or hydrogen or a C1-C2 alkyl, or hydrogen or methyl, or hydrogen.

In one embodiment, the at least one bridged cyclic olefin selected from the following:
c)

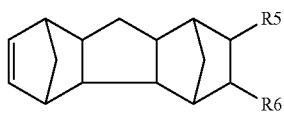

Structure c, wherein R5 and R6 are each, independently, selected from hydrogen, an alkyl (linear or branched or cyclic). In a further embodiment, R1 and R2 are each, independently, selected from hydrogen or a C1-C6 alkyl, and further hydrogen or a C1-C5 alkyl, or hydrogen or a C1-C4 alkyl, or hydrogen or a C1-C3 alkyl, or hydrogen or a C1-C2 alkyl, or hydrogen or methyl, or hydrogen.

In one embodiment, the at least one bridged cyclic olefin selected from the following:
d)

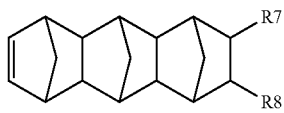

Structure d, wherein R7 and R8 are each, independently, selected from hydrogen, an alkyl (linear or branched or cyclic). In a further embodiment, R1 and R2 are each, independently, selected from hydrogen or a C1-C6 alkyl, and further hydrogen or a C1-C5 alkyl, or hydrogen or a C1-C4 alkyl, or hydrogen or a C1-C3 alkyl, or hydrogen or a C1-C2 alkyl, or hydrogen or methyl, or hydrogen.

In one embodiment, the cycloolefin interpolymer of component B comprises, in polymerized form, ethylene and only one bridged cyclic olefin selected from Structures a to d as defined herein.

In one embodiment, the composition further comprises an ethylene vinyl acetate copolymer. In a further embodiment, the ethylene vinyl acetate copolymer is present in an amount from 5 to 20 wt %, based on the weight of the composition.

In one embodiment, the composition does not contain a coupling agent, for example, an azide compound or a peroxide.

The composition may comprise one or more additional additives. Suitable additives include, but are not limited to, fillers, antioxidants, UV stabilizers, flame retardants, colorants or pigments, crosslinking agents, slip agents, antiblocks, and combinations thereof. In one embodiment, the composition comprises one or more additional additives in an amount from 0.5 to 20 wt %, or 1 to 15 wt %, or 5 to 10 wt %, based on the weight of the composition. In a further embodiment, the composition comprises a slip agent and/or an antiblock in an amount from 0.5 to 20 wt %, or 1 to 15 wt %, or 5 to 10 wt %, based on the weight of the composition.

In one embodiment, the composition further comprises a thermoplastic polymer. Such polymers include, but are not limited to, propylene-based polymers, ethylene-base polymers, and olefin multi-block interpolymers. Suitable ethylene-base polymers include, but are not limited to, high density polyethylene (HDPE), linear low density polyethylene (LLDPE), low density polyethylene (LDPE), homogeneously branched linear ethylene/α-olefin interpolymers or copolymers, and homogeneously branched substantially linear ethylene/α-olefin interpolymers or copolymers (that is homogeneously branched long chain branched ethylene/α-olefin interpolymers or copolymers).

In one embodiment, the composition has a Tm ≥80° C., or ≥81° C., or ≥82° C. In one embodiment, the composition has a Tm ≤90° C., or ≤88° C., or ≤86° C.

In one embodiment, the composition has a V0.1 (130° C.) value ≥35,000 Pa·s, or ≥40,000 Pa·s, or ≥45,000 Pa·s. In one embodiment, the composition has a V0.1 (130° C.) value ≤65,000 Pa·s, or ≤60,000 Pa·s, or ≤55,000 Pa·s.

In one embodiment, the composition has a V100 (130° C.) value from 2,800 Pa·s to 4,000 Pa·s, or from 3,000 Pa·s to 3,800 Pa·s, or from 3,200 Pa·s to 3,600 Pa·s.

In one embodiment, the composition has a V0.1/V100 (RR) value ≥10, or ≥11, or ≥12. In one embodiment, the composition has a V0.1/V100 (RR) value ≤16, or ≤15, or ≤14.

In one embodiment, the composition has an E1 value from 0.84 to 0.92, or from 0.85 to 0.91, or from 0.86 to 0.90.

In one embodiment, the composition has an E2 value from 0.92 to 0.98, or from 0.93 to 0.97, or from 0.94 to 0.96.

In one embodiment, the composition has an Ec value from 0.40 to 0.60, or from 0.41 to 0.59, or from 0.42 to 0.58.

Also is provided a film comprising at least one layer formed from the composition of any one or more embodiments described herein. In a further embodiment, the film comprising a core layer formed from a core composition comprising ≤1.0 wt %, or ≤0.5 wt %, or ≤0.2 wt %, ≤0.1 wt % of an ethylene/bridged cyclic olefin interpolymer or copolymer. In a further embodiment, the core composition does not comprise an ethylene/bridged cyclic olefin interpolymer or copolymer.

In one embodiment, the film comprises at least one additional layer, formed from a composition comprising from 1 to 12 wt % of an ethylene/bridged cyclic olefin interpolymer or copolymer, based on the weight of this composition.

Also is provided a film comprising at least three layers a/b/c, and wherein layer b is formed from a composition comprising ≤1.0 wt %, or ≤0.5 wt %, or ≤0.2 wt %, ≤0.1 wt %, or none, of an ethylene/bridged cyclic olefin interpolymer or copolymer; and wherein the layer a and/or layer c are each, independently, formed from a composition of one or more embodiments described herein.

Also is provided a film comprising at least five layers a/b/c/d/e, and wherein layer c is formed from a composition comprising ≤1.0 wt %, or ≤0.5 wt %, or ≤0.2 wt %, ≤0.1 wt %, or none, of an ethylene/bridged cyclic olefin interpolymer or copolymer; and wherein the layer a, layer b, layer d and/or layer e are each, independently, formed from a composition of one or more embodiments described herein.

Also is provided a film comprising at least six layers a/b/c/d/e/f, and wherein layer c and layer d are each, independently, formed from a composition comprising ≤1.0 wt %, or ≤0.5 wt %, or ≤0.2 wt %, ≤0.1 wt %, or none, of an ethylene/bridged cyclic olefin interpolymer or copolymer; and wherein the layer a, layer b, layer e and/or layer f are each, independently, formed from a composition of one or more embodiments described herein.

In one embodiment, a film comprising at least one layer formed from the composition of any one or more embodiments described herein has a thickness of from 0.5 to 10 mil, or from 4 to 7 mil, or from 5 to 6 mil.

Also is provided an article comprising at least one component formed from the composition of any one or more embodiments described herein.

Also is provided an article comprising at least one component formed from the film of any one or more embodiments described herein.

Definitions

Unless stated to the contrary, implicit from the context, or customary in the art, all parts and percents are based on weight, and all test methods are current as of the filing date of this disclosure.

The term "composition," as used herein, includes the material(s), which comprise the composition, as well as reaction products and decomposition products formed from the materials of the composition. Any reaction product or decomposition product is typically present in trace or residual amounts.

The term, "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, can be incorporated into and/or within the polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term, "olefin-based polymer," as used herein, refers to a polymer that comprises, in polymerized form, 50 wt % or a majority amount of olefin monomer, for example ethylene or propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "ethylene-based interpolymer," as used herein, refers to an interpolymer that comprises, in polymerized form, a 50 wt % or a majority weight percent of ethylene (based on the weight of the interpolymer), and at least one comonomer.

The term, "ethylene-based copolymer," as used herein, refers to a copolymer that comprises, in polymerized form, 50 wt % or a majority amount of ethylene monomer (based on the weight of the copolymer), and an α-olefin, as the only two monomer types.

The term, "ethylene/α-olefin copolymer," as used herein, refers to a copolymer that comprises, in polymerized form, 50 wt % or a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

As one of ordinary skill in the art would understand, the term "COC" refers to a cyclic olefin copolymer.

Test Methods

Differential Scanning Calorimetry (DSC) (Component A, Component B, Composition)

Differential Scanning Calorimetry (DSC) is used to measure melting and crystallization behavior of polymers (e.g., ethylene-based (PE) polymers). In the case of compounded Bland, the sample is first melt pressed (25000 lbs for about 10 sec) into a thin film, at about 175° C., and then cooled to room temperature. About 5 to 8 mg of polymer film sample is cut with a die punch and is weighed and placed into a DSC pan. In the case of fabricated films, the sample is directly punched from the film. The lid is crimped on the pan to ensure a closed atmosphere. The sample pan is placed into a calibrated DSC cell purged with nitrogen gas, and then heated at a rate of approximately 10° C./min, to a temperature of 180° C. The sample is kept at this temperature for three minutes. Then the sample is cooled at a rate of 10° C./min to −40° C. to record the crystallization trace, and kept isothermally at that temperature for three minutes. The sample is next reheated at a rate of 10° C./min, until complete melting. Unless otherwise stated, peak melting point (Tm) is determined from the first heating curve, and corresponds to the temperature of the highest peak (intensity) in the endotherm. The crystallization temperature (Tc) is determined from the cooling curve (peak Tc). The onset end of the melting temperature can be defined as the extrapolated end of the melting curve calculated from the intersection of two lines a and b, where a is the tangent with the point of maximum slope on the secondary side of the peak and b is the extrapolation of the baseline after the melting. The Tg is measured from the second heating curve, and determined at the midpoint of the inflection transition. Some DSCs transitions are shown in FIG. 1.

Tensile Strength and Tensile Energy to Break (MD and CD)

Tensile Strength and Tensile Energy to Break (MD and CD) were measured in accordance with ASTM D882-10 (average of five film samples in each direction; each sample "1 in×6 in" or 25 mm×150 mm). Before characterization samples were preconditioned for 40 hours at temperature from 21° C. to 25° C., and relative humidity of 50%±5. Preparation of each film is described in the experimental section below.

Density

Samples that are measured for density are prepared according to ASTM D-1928. Within one hour of sample pressing, measurement are made using ASTM D-792, Method B.

Melt Index

Melt index ($I_2$) is measured in accordance with ASTM-D 1238, Condition 190° C./2.16 kg, and is reported in grams eluted per 10 minutes.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and the beginning of the test, was set to five minutes for all samples. The experiments were performed at 130° C., over a frequency range of 0.1 to 100 rad/s. The strain amplitude was adjusted, based upon the response of the samples, from 1 to 10%. The stress response was analyzed in terms of amplitude and phase, from which, the storage modulus (G'), loss modulus (G"), dynamic viscosity $\eta^*$, tan delta, and phase angle were determined. The viscosities V0.1 at 130° C. and V100 at 130° C., and rheology ratio (V0.1/V100 at 130° C.; also referred to as "RR") were recorded. Specimens for Dynamic Mechanical Spectroscopy were "25 mm diameter×3.3 mm thick" compression molded discs, formed at 180° C., and 10 MPa molding pressure, for five minutes, and then quenched between chilled platens (15-20° C.) for two minutes.

EXPERIMENTAL

The following examples illustrate the present invention but are not intended to limit the scope of the invention. Materials are listed below. Polymers are typically stabilized with ppm amounts of one or more stabilizers.

ELVAX® 460 (hereinafter "ELVAX 460") is an EVA, available from DuPont, with a density of 0.941 g/cc (1 cc=1 cm³), a melt index (I2) of 2.5 g/10 min, and a VA content of 18 wt % (based on the weight of the EVA).

ELVAX® 470 (hereinafter "ELVAX 470") is an EVA, available from DuPont, with a density of 0.94 g/cc, a melt index (I2) of 0.7 g/10 min, and a VA content of 18 wt % (based on the weight of the EVA).

AMPACET 100329 is a slip agent, available from AMPACET Corp.

AMPACET 100342 is an antiblock, available from AMPACET Corp.

AMPACET 10090 is a slip agent, available from AMPACET Corp.

AMPACET 100450 is an antiblock, available from AMPACET Corp.

ALCUDIA® PA-539 (hereinafter "ALCUDIA 539") is an EVA, available from Entec Polymers, with a density of 0.937 g/cc, a melt index (I2) of 2 g/10 min, and a VA content of 18 wt % (based on the weight of the EVA).

ALCUDIA® PA-537 (hereinafter "ALCUDIA 537") is an EVA, available from Entec Polymers, with a density of 0.941 g/cc, a melt index (I2) of 0.7 g/10 min, and a VA content of 18 wt % (based on the weight of the EVA).

ENGAGE™ 8003 (hereinafter "ENGAGE 8003") is an ethylene/octene copolymer, available from The Dow Chemical Company, with a density of 0.885 g/cc, a melt index (I2) of 1.0 g/10 min and a Tg of −46° C.

ENGAGE™ 8540 (hereinafter "ENGAGE 8540") is an ethylene/octene copolymer, available from The Dow Chemical Company, with a density of 0.908 g/cc, a melt index (I2) of 1.0 g/10 min, and a Tg of -32° C.

ENGAGE™ 8100 (hereinafter "ENGAGE 8100") is an ethylene/octene copolymer, available from The Dow Chemical Company, with a density of 0.87 g/cc, a melt index (I2) of 1.0 g/10 min and a Tg of −52° C.

NORDEL™ IP 4820 (hereinafter "NIP4820") an EPDM, available from The Dow Chemical Company, with a density of 0.88 g/cc, a melt index (I2) of 1.0 g/10 min and a Tg of −18° C.

AFFINITY™ PF 1140G POP (hereinafter "AFFINITY 1140") is an ethylene/octene copolymer (random), available from The Dow Chemical Company, with a density of 0.897 g/cc, a melt index (I2) of 1.6 g/10 min, and a Tg of −33° C.

AFFINITY™ VP 8770G1 POP (hereinafter "AFFINITY 8770") is an ethylene/octene copolymer (random), available from The Dow Chemical Company, with a density of 0.885 g/cc, a melt index (I2) of 1.0 g/10 min, and a Tg of −46° C.

VERSIFY™ 2200 (hereinafter "VERSIFY 2200") is an propylene/ethylene copolymer, available from The Dow Chemical Company, with a density of 0.876 g/cc, and a melt flow rate at 230° C. (MFR) of 2.0 g/10 min.

LDPE 132I is polyethylene homopolymer available from The Dow Chemical Company, with a density of 0.921 g/cc, and a melt index (I2) of 0.25 g/10 min.

TOPAS® 9506F-04 (hereinafter "TOPAS 9506F-04") is a COC copolymer (ethylene and norbornene), available from Topas Advanced Polymers, with a density of 1.02 g/cc, a melt volume rate (MVR), at 230° C./2.16 kg (ISO 1133), of 6 cm³/10 min, a melt index, at 190° C./2.16 kg, of 0.9 g/10 min, and a Tg of 63° C.

TOPAS® 8007F-04 (hereinafter "TOPAS 8007F-04") is a COC copolymer (ethylene and norbornene), available from Topas Advanced Polymers, with a density of 1.02 g/cc, a melt volume rate (MVR), at 230° C./2.16 kg (ISO 1133), of 12 cm³/10 min, a melt index, at 190° C./2.16 kg, of 1.8 g/10 min, and a Tg of 77° C.

"AB" refers to 20 wt % of Talc AB compounded with 80 wt % ENGAGE 8003.

Properties of Compositions

Rheology

Figure 2:
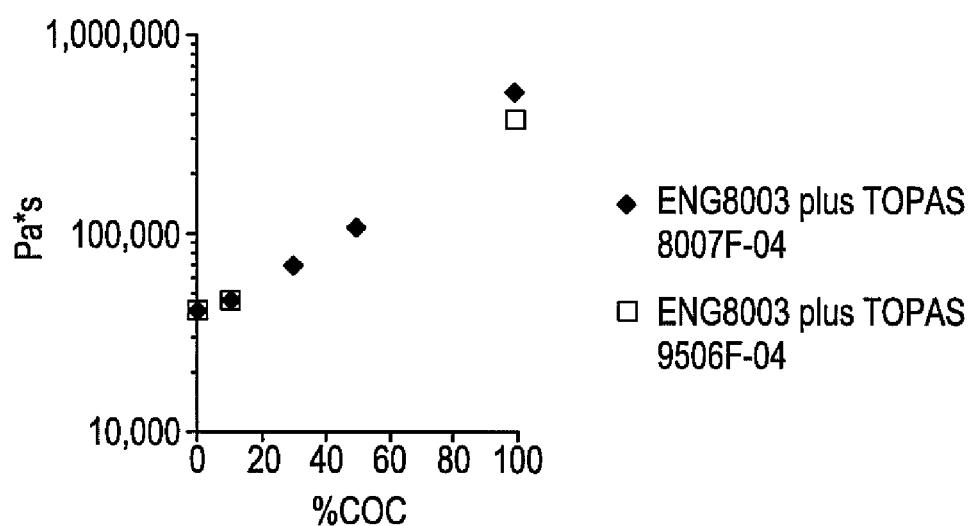
FIG. 2 depicts the "V0.1 (melt viscosity) versus wt % COC" profiles for the noted compositions.
Figure 3:
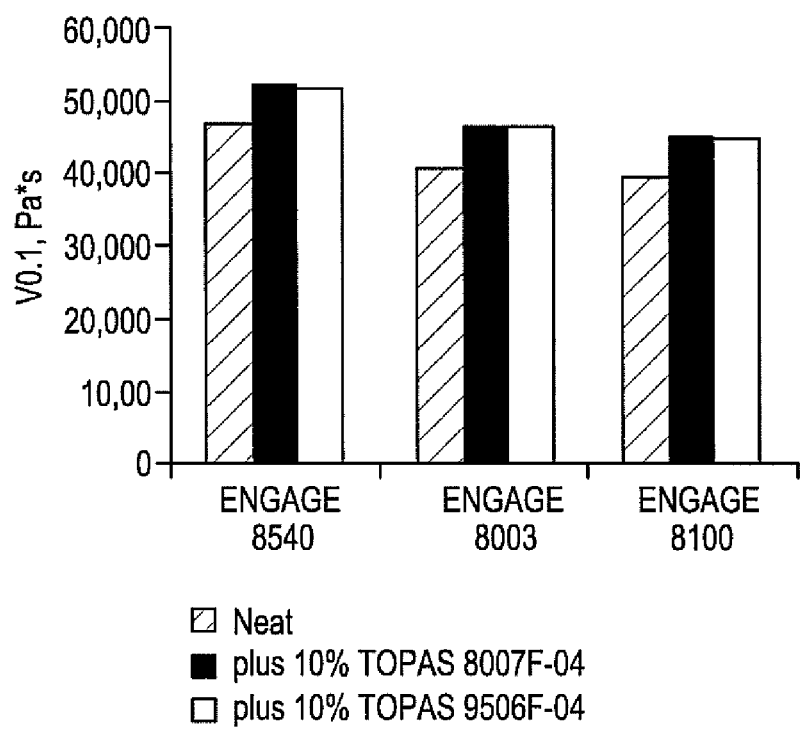
FIG. 3 is a bar graph depicting the V0.1 values for the noted compositions.

To determine the melt-flow properties of polymers and the above polymer compositions, dynamic oscillatory shear measurements were conducted over a range from 0.1 rad s$^{-1}$ to 100 rad s$^{-1}$, at a temperature of 130° C. and 10% strain, using stainless steel, parallel plates of "25-mm diameter." See above DMS test method. Test sample has 25 mm diameter and a thickness of 3.3 mm, on a strain-controlled rheometer, ARES/ARES-G2 by TA Instruments. The V0.1 and V100 are the viscosities at 0.1 rad s$^{-1}$ and 100 rad s$^{-1}$, respectively, with V0.1/V100 ratio being a measure of shear thinning characteristics. The effect of the "COC" content on the composition rheology is shown below in Tables 1-3. See also FIG. 2 and FIG. 3.

TABLE 1

|  | ENGAGE 8003 (EO-03) | ENGAGE 8003 90 wt %:TOPAS 8007F-04 10 wt % | ENGAGE 8003 70 wt %:TOPAS 8007F-04 30 wt % | ENGAGE 8003 50 wt %:TOPAS 8007F-04 50 wt % | TOPAS 8007F-04 |
|---|---|---|---|---|---|
| wt % TOPAS | 0 | 10 | 30 | 50 | 100 |
| V0.1 (130° C.), Pa · s | 40,693 | 46,221 | 68,946 | 106,810 | 512,117 |
| V100 (130° C.), Pa · s | 3,334 | 3,443 | 3,756 | 4,092 | 5,900 |
| RR (V0.1/V100) | 12 | 13 | 18 | 26 | 87 |
| % Increase in V0.1 vs EO-03 |  | 14 | 69 | 162 | 1158 |

TABLE 2

|  | ENGAGE 8003 (EO-03) | ENGAGE 8003 90 wt %: TOPAS 9506F-04 10 wt % | TOPAS 9506F-04 |
|---|---|---|---|
| wt % TOPAS added to EO-03 | 0 | 10 | 100 |
| V0.1 (130° C.), Pa · s | 40,693 | 46,112 | 372,615 |
| V100 (130° C.), Pa · s | 3,334 | 3,440 | 5,582 |
| RR (V0.1/V100) | 12 | 13 | 67 |
| % Increase in V0.1 vs EO-03 |  | 13 | 816 |

TABLE 3

Effect of 10% COC on the V0.1 of various POEs (1 MI, 0.908-0.870 density) at 130° C.

| ENGAGE 8540 | ENGAGE 8003 | ENGAGE 8100 | ENGAGE 8540 90 wt %:TOPAS 8007F-04 10 wt % | ENGAGE 8003 90 wt %:TOPAS 8007F-04 10 wt % | ENGAGE 8100 90 wt %:TOPAS 8007F-04 10 wt % | ENGAGE 8540 90 wt %:TOPAS 9506F-04 10 wt % | ENGAGE 8003 90 wt %:TOPAS 9506F-04 10 wt % | ENGAGE 8100 9 0wt %:TOPAS 9506F-04 10 wt % |
|---|---|---|---|---|---|---|---|---|
| 46,531 Pa · s | 40,693 Pa · s | 39,396 Pa · s | 51,976 Pa · s | 46,221 Pa · s | 44,753 Pa · s | 51,627 Pa · s | 46,112 Pa · s | 44,589 Pa · s |

Film Production

Inventive (Inv.) and comparative (Comp.) films are presented below. Tables 7A-7F and 8 show the compositions of each layer of each film; each weight percent is based on total weight of the respective composition used to form each film layer. Each composition used to form each film layer was prepared using a HAAKE Rheomix 3000, equipped with roller mixing blades, at a mixing speed of 40 RPM. The raw materials were dry mixed before adding to the mixer, which was preheated to 150° C. A mixing time of five minutes was used after the addition of raw materials and the securing of the ram.

Each five layer film (skin/intermediate/core/intermediate/skin) was produced on a five-layer blown film line. The blown film line was a 75 mm 5-Layer Flat Die (30/10/20/10/30), with 25 mm skin extruders and 20 mm intermediate/core extruders. The line had a Dual Lip Air Ring, ABS Gravimetric Feed, and Dual Surface Winders. Films from 0.8 mils to 6 mils thickness can be produced, with blow up ratios from 2.2 to 3.9, production rates from 9 to 27 kg/hr, and haul-off from 2.4 to 18 meter per min. The line was capable of on-line slitting and separating film layers. On-line slitting and separating film layers were performed for all examples except for Inv. F4. On-line slitting and film layer separation was not performed in Inv. F4, but instead left as a collapsed bubble. Table 6 below provides the processing conditions for the production of multilayer (5) films.

Inv. F3 and Comp. F12 were prepared on a seven layer blown film line. The remaining films were prepared on the five layer blown film line. The Alpine 7-Layer Coextrusion Blown Film Line was used to fabricate Inv. F3 and Comp. F12. This line consisted of a 7-layer coex die with inserts available in widths of 200 mm and 250 mm, a 7-50 mm 30:1 L/D grooved fed extruders utilizing barrier type screws, four component Maguire in-line blenders for each extruder, ExVis an Alpine control system, an NDC gauge thickness detection system with auto gauging, a 358° oscillating nip roll capable of speeds up to 400 fpm and film width of 60 inches, and a Pillar corona device. Table 8 below shows the compositions for each film layer and film process conditions for the production of each seven layer film. Each weight percent is based on total weight of the respective composition used to form each film layer. See also Table 9. Some additional film properties are shown in Tables 10A-10C below.

Tensile Properties

Tensile properties will be defined by the modulus of the compositions of the films. The higher the modulus, the higher the stress the composition can handle, without significant deformation. The information here reported the stress required to deform the composition 7% and 25% in the machine direction (MD). See Table 5 below.

Processing Time

Figure 4:
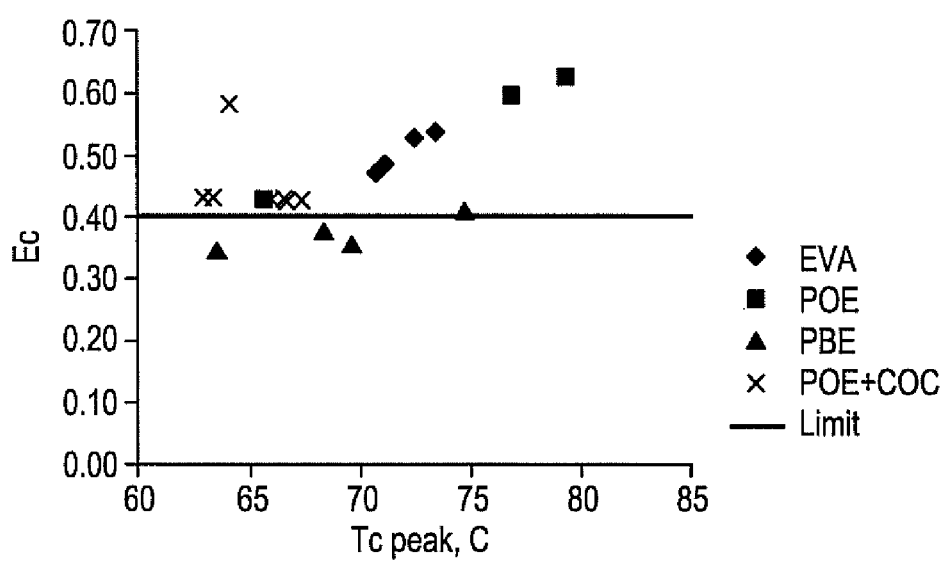
FIG. 4 depicts the "Ec versus Tc (peak)" profiles for the noted polymers and compositions.

Here the processing time is the time required for the compositions of the films to cool down below the transition temperature of the composition therefore recovering the typical properties of a solid-like composition. It is known that the higher the transition temperature, the faster the composition sets. It has been discovered that a temperature dependent constraint of 60° C., above which crystallization should have already taken place, was suitable for the inventive compositions. To describe the crystallization profile above this temperature, the parameter Ec was defined as the fraction of the enthalpy of crystallization above 60° C., relative to the total enthalpy of crystallization measured by DSC. The FIG. 4 shows "Ec as a function of the crystallization temperature peak (TC peak)" for four sets of compositions described below. See Tables 4 and 5 below.

A set of "18 wt %VA EVAs" with a peak melting temperature of 88° C. These compositions show a relatively high Tc and Ec values, indicating that more than 40% of the enthalpy of crystallization occurred well above the 60° C. constraint. An Ec of 0.4 (40%) is expected to result in acceptable processing times.

Ethylene-based polymers with melting temperatures from 75° C. to 95° C. An increase in crystallinity drives both Tc and Ec upwards (increase in Tc and Ec). This set of samples meets the Ec of 0.4. The POEs exhibiting Tm lower than 75° C., have a Tc value lower than the 60° C. constraint (Ec approaching to zero, i.e., ENGAGE 8100, 0.87 density, 1 MI), and their processing would be excessively long.

Compositions of propylene based elastomers (PBE) with POE's. Typically a PBE will have a higher modulus than a POE, and this higher modulus will increase the modulus of PBE/POE blend to that approaching EVA. However, the PBE fraction in the blend crystallizes well below the "60° C. temperature constraint," therefore affecting the EC of the blend, and making its processing unpractical (the crystallization above 60° C. is less than 40%, Ec<0.4). It was discovered that only one of the PBE samples was able to match the 40% enthalpy of crystallization, however, as it will be shown below, this composition has unacceptable E2 value.

Compositions of POE and COC with matching transition temperatures in the 70° C. to 100° C. temperature range. In this case, the POE selected had a Tm peak of 82° C., and the COC a Tg of 77° C. Various levels of the COC where explored in the 3 to 15 wt % range. It has been discovered, as shown in the graph, these compositions preserve the crystallization behavior of the POE (EC≥0.4 and Tc peak ≥60° C.).

Dispersion

It has been discovered that that the following two temperature constraints can be used to optimize the dispersion of the polymer components of the film compositions. The two temperature dependent constraints are as follows: 1) a target temperature of 85° C., below which, it is desire the composition exhibits its DSC melting temperature peak (Tm), and 2) a target temperature of 95° C., below which, it is desire the composition exhibits its DSC onset Tm at end of melting. Above the "onset Tm, at end of melting," the melting profile ends and returns to the DSC base line, and the composition is considered molten.

E1. Fraction of the enthalpy of melting below 85° C., relative to the total enthalpy of melting measured by DSC. See FIG. 5. E2. Fraction of the enthalpy of melting between Tm and 95° C., relative to the enthalpy of melting above Tm measured by DSC. See FIG. 6.

Figure 5:
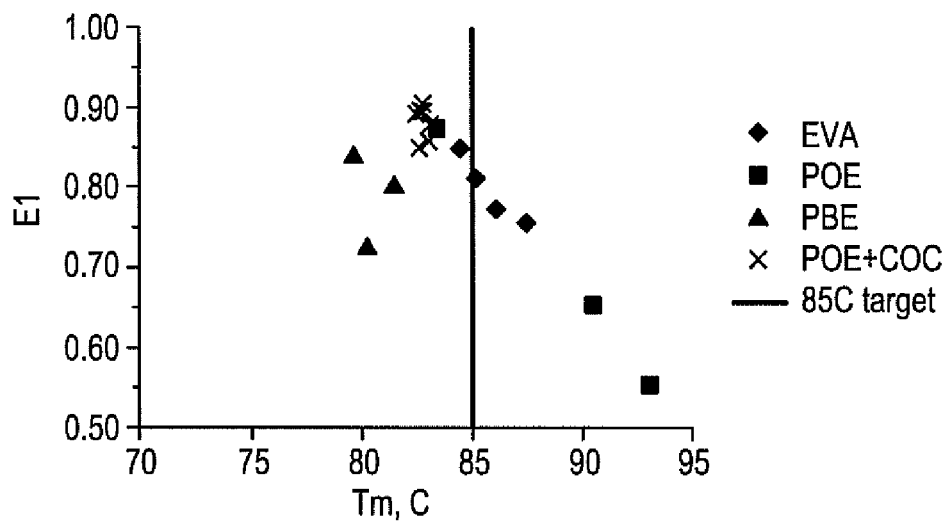
FIG. 5 depicts the "E1 versus Tm" profiles for the noted examples.
Figure 6:
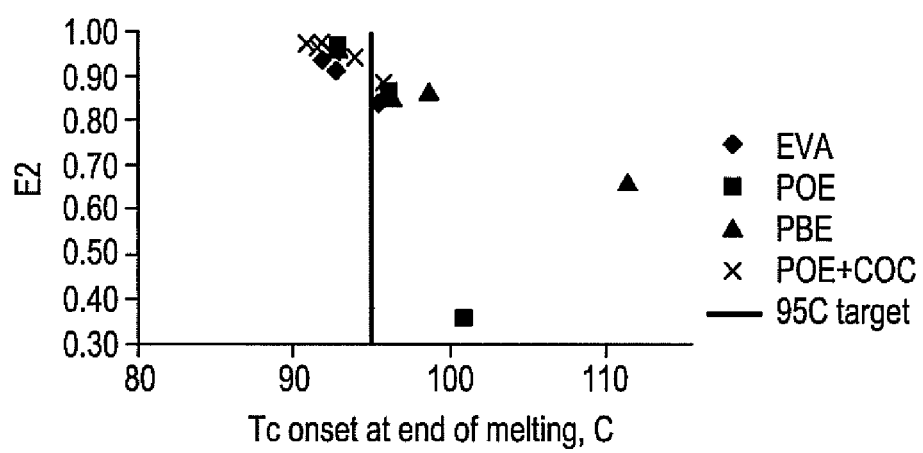
FIG. 6 depicts the "E2 versus Tc onset at end of melting" profiles for the noted examples.

Based on the above analyses, it has been discovered that the three efficiencies (Ec, E1, E2) are required to approach one, to minimize processing time and eliminate the presence of undispersed polymer (gels) after compounding. FIG. 4-5 show a schematic of the efficiencies defined here. See also Tables 4 and 5 below.

TABLE 4

| Index | Equal to 1 (Preferred) | Equal to 0 (Not preferred) | Parameter |
|---|---|---|---|
| Ec | FAST<br>The composition fully crystallized above 60° C. | SLOW<br>The composition has not started to crystallize at 60° C. | Processing time |
| E1 | No gels in final product<br>The composition is in the molten state past 85° C. | Gels in final product<br>The composition's crystallinity is too high and it has not started to melt at 85° C. | Dispersion |
| E2 | No gels in final product<br>The bulk of the composition is in the molten state near 85° C. and it is in the molten state past 95° C. | Gels in final product<br>The compositions crystallinity is too high and has remaining crystallinity beyond 95° C. | Dispersion |

TABLE 5

| | | Stress @7% strain, ksi | Stress @25% strain, ksi | Tm peak, ° C. | Tm onset at end of melting, ° C. | E1 | E2 | Ec |
|---|---|---|---|---|---|---|---|---|
| Comp. F1 | EVA1 | 0.29 | 0.58 | 86 | 95 | 0.77 | 0.83 | 0.53 |
| Comp. F2 | EVA2 | 0.38 | 0.65 | 85 | 93 | 0.81 | 0.91 | 0.48 |
| Comp. F3 | EVA3 | 0.33 | 0.60 | 85 | 92 | 0.85 | 0.93 | 0.47 |
| Comp. F4 | POE1 | 0.25 | 0.47 | 84 | 93 | 0.87 | 0.97 | 0.43 |
| Comp. F5 | POE2 | 0.46 | 0.68 | 91 | 96 | 0.65 | 0.87 | 0.59 |
| Comp. F6 | POE3 | 0.45 | 0.72 | 93 | 101 | 0.55 | 0.36 | 0.62 |

TABLE 5-continued

|  |  | Stress @7% strain, ksi | Stress @25% strain, ksi | Tm peak, °C. | Tm onset at end of melting, °C. | E1 | E2 | Ec |
|---|---|---|---|---|---|---|---|---|
| Comp. F7 | POE1 with COC @3 wt % | 0.35 | 0.56 | 83 | 91 | 0.90 | 0.97 | 0.43 |
| Inv. F1 | POE1 with COC @9 wt % | 0.57 | 0.76 | 83 | 92 | 0.90 | 0.96 | 0.43 |
| Comp. F8 | POE1 with COC @15 wt % | 1.08 | 1.17 | 83 | 92 | 0.89 | 0.95 | 0.43 |
| Inv. F2 | POE1 with COC @10 wt % | 0.65 | 0.81 | 83 | 94 | 0.86 | 0.94 | 0.42 |
| Inv. F3 | POE1 with COC @10 wt % | 0.65 | 0.87 | 83 | 92 | 0.88 | 0.95 | 0.58 |
| Comp. F9 | POE1 with PBE | 0.42 | 0.68 | 80 | 96 | 0.84 | 0.85 | 0.35 |
| Comp. F10 | POE1 with PBE | 0.46 | 0.71 | 80 | 109 | 0.73 | 0.67 | 0.41 |
| Comp. F11 | POE1 with PBE | 0.42 | 0.69 | 80 | 95 | 0.89 | 0.94 | 0.35 |
| Comp. F12 | POE1 with PBE | 0.51 | 0.78 | 82 | 99 | 0.80 | 0.86 | 0.38 |
| Inv. F4 | POE1 with COC @10 wt % | 0.58 | 0.80 | 83 | 92 | 0.89 | 0.96 | 0.43 |
| Inv. F5 | POE1 with COC @10 wt % | 0.71 | 0.87 | 83 | 96 | 0.85 | 0.88 | 0.43 |

POE1 = ENGAGE 8003, POE2 = NORDEL IP 4820, POE3 = AFFINITY 1140, COC = TOPAS 8007F-04 (noted as "TOPAS 8007" in some tables), EVA1 = ELVAX 460, EVA2 = ELVAX 470, EVA3 = ALCUDIA 537, PBE = VERSIFY 2200.

TABLE 6

Processing Conditions, Multilayer Films

|  | Extruder 1 | Extruder 2 | Extruder 3 | Extruder 4 | Extruder 5 |
|---|---|---|---|---|---|
| Barrel 1° C. | 132 | 132 | 132 | 132 | 132 |
| Barrel 2° C. | 149 | 149 | 149 | 149 | 149 |
| Barrel 3° C. | 177 | 177 | 177 | 177 | 177 |
| Barrel 4° C. | 188 | — | — | — | 188 |
| Die ° C. | 216 | 216 | 216 | 216 | 216 |
| Melt ° C. | 209 | 216 | 219 | 21 | 211 |
| Pressure (MPa) | 17.7 | 26.3 | 22.3 | 27.4 | 18.8 |
| Speed rpm | 52 | 62 | 129 | 62 | 51 |
| Current % | 81 | 63 | 62 | 60 | 75 |
| Production rate kg/hr | 3.6 | 1.9 | 3.5 | 1.9 | 3.6 |

TABLE 7A

|  |  | EVA1 (Comp. F1) | | EVA2 (Comp. F2) | | EVA3 (Comp. F3) | |
|---|---|---|---|---|---|---|---|
|  |  | Total Gauge | | | | | |
|  |  | 6 mil | | 6 Mil | | 6 mil | |
|  |  | Amt. wt % | Component | Amt. wt % | Component | Amt. wt % | Component |
| Layer 1 |  | 95 | ELVAX 460 | 20 | ELVAX 460 | 94 | ALCUDIA 539 |
|  |  |  |  | 74 | ELVAX 470 |  |  |
|  |  | 2.5 | AMPACET 10090 |  |  |  |  |
|  |  | 2.5 | AMPACET 100450 | 3 | AMPACET 100329 | 3 | AMPACET 100329 |
|  |  |  |  | 3 | AMPACET 100342 | 3 | AMPACET 100342 |
| Total |  | 100 |  | 100 |  | 100 |  |
| Layer 2 |  | 100 | ELVAX 460 | 20 | ELVAX 460 | 100 | ALCUDIA 537 |
|  |  |  |  | 80 | ELVAX 470 |  |  |
| Total |  | 100 |  | 100 |  | 100 |  |
| Layer 3 |  | 100 | ELVAX 460 | 20 | ELVAX 460 | 100 | ALCUDIA 537 |
|  |  | 0 |  | 80 | ELVAX 470 | 0 |  |
|  |  | 0 |  | 0 |  | 0 |  |
| Total |  | 100 |  | 100 |  | 100 |  |
| Layer 4 |  | 100 | ELVAX 460 | 20 | ELVAX 460 | 100 | ALCUDIA 537 |
|  |  | 0 |  | 80 | ELVAX 470 | 0 |  |
| Total |  | 100 |  | 100 |  | 100 |  |
| Layer 5 |  | 95 | ELVAX 460 | 20 | ELVAX 460 | 94 | ALCUDIA 537 |
|  |  | 0 |  | 74 | ELVAX 470 | 0 |  |

TABLE 7A-continued

|  | 2.5 | AMPACET 10090 | 0 |  | 0 |  |
|---|---|---|---|---|---|---|
|  | 2.5 | AMPACET 100450 | 3 | AMPACET 100329 | 3 | AMPACET 100329 |
|  |  |  | 3 | AMPACET 100342 | 3 | AMPACET 100342 |
| Total | 100 |  | 100 |  | 100 |  |

| Overall | Amt. wt % | Thickness mil | Amt. wt % | Thickness mil | Amt. wt % | Thickness mil |
|---|---|---|---|---|---|---|
| Layer 1 | 30 | 1.8 | 30 | 1.8 | 30 | 1.8 |
| Layer 2 | 10 | 0.6 | 10 | 0.6 | 10 | 0.6 |
| Layer 3 | 20 | 1.2 | 20 | 1.2 | 30 | 1.8 |
| Layer 4 | 10 | 0.6 | 10 | 0.6 | 10 | 0.6 |
| Layer 5 | 30 | 1.8 | 30 | 1.8 | 20 | 1.2 |
| Total | 100 | 6 | 100 | 6 | 100 | 6 |
| Die Size, in |  | 2.95 |  | 2.95 |  | 2.95 |
| Film Gauge, mil |  | 6 |  | 6 |  | 6 |
| Layflat, in width |  | 11.6 |  | 11.6 |  | 14.0 |
| BUR |  | 2.5 |  | 2.5 |  | 3.0 |
| Die gap, mil |  | 78.7 |  | 78.7 |  | 78.7 |

TABLE 7B

|  | POE1 (Comp. F4) | | POE2 (Comp. F5) | | POE3 (Comp. F6) | |
|---|---|---|---|---|---|---|
|  | 6.5 Amt. wt % | Mil Component | 6.5 Amt. wt % | Mil Component | 6.5 Amt. wt % | mil Component |
| Layer 1 | 94 | ENGAGE 8003 | 94 | NIP4820 | 94 | AFFINITY 1140 |
|  | 3 | AMPACET 100329 | 3 | AMPACET 100329 | 3 | AMPACET 100329 |
|  | 3 | AMPACET 100342 | 3 | AMPACET 100342 | 3 | AMPACET 100342 |
| Total | 100 |  | 100 |  | 100 |  |
| Layer 2 | 100 | ENGAGE 8003 | 100 | NIP4820 | 100 | AFFINITY 1140 |
| Total | 100 |  | 100 |  | 100 |  |
| Layer 3 | 100 | ENGAGE 8003 | 100 | NIP4820 | 100 | AFFINITY 1140 |
| Total | 100 |  | 100 |  | 100 |  |
| Layer 4 | 100 | ENGAGE 8003 | 100 | NIP4820 | 100 | AFFINITY 1140 |
| Total | 100 |  | 100 |  | 100 |  |
| Layer 5 | 94 | ENGAGE 8003 | 94 | NIP4820 | 94 | AFFINITY 1140 |
|  | 3 | AMPACET 100329 | 3 | AMPACET 100329 | 3 | AMPACET 100329 |
|  | 3 | AMPACET 100342 | 3 | AMPACET 100342 | 3 | AMPACET 100342 |
| Total | 100 |  | 100 |  | 100 |  |

| Overall | Amt. wt % | Thickness mil | Amt. wt % | Thickness mil | Amt. wt % | Thickness mil |
|---|---|---|---|---|---|---|
| Layer 1 | 25 | 1.625 | 20 | 1.3 | 30 | 1.95 |
| Layer 2 | 15 | 0.975 | 15 | 0.975 | 10 | 0.65 |
| Layer 3 | 20 | 1.3 | 30 | 1.95 | 20 | 1.3 |
| Layer 4 | 15 | 0.975 | 15 | 0.975 | 10 | 0.65 |
| Layer 5 | 25 | 1.625 | 20 | 1.3 | 30 | 1.95 |
| Total | 100 | 6.5 | 100 | 6.5 | 100 | 6.5 |
| Die Size, in |  | 2.95 |  | 2.95 |  | 2.95 |
| Film Gauge, mil |  | 6.5 |  | 6.5 |  | 6.5 |
| Layflat, in width |  | 14 |  | 14 |  | 14 |
| BUR |  | 3.0 |  | 3.0 |  | 3.0 |
| Die gap, mil |  | 78.7 |  | 78.7 |  | 78.7 |

TABLE 7C

|  | POE1 with COC @ 3 wt % (Comp. F7) | | POE1 with COC @ 9 wt % (Inv. F1) Total Gauge | | POE1 with COC @ 15 wt % (Comp. F8) | |
| --- | --- | --- | --- | --- | --- | --- |
|  | 5.9 Amt. wt % | Mil Component | 5.9 Amt. wt % | Mil Component | 5.9 Amt. wt % | mil Component |
| Layer 1 | 91 | ENGAGE 8003 | 85 | ENGAGE 8003 | 79 | ENGAGE 8003 |
|  | 3 | TOPAS 8007 | 9 | TOPAS 8007 | 15 | TOPAS 8007 |
|  | 3 | AMPACET 100329 | 3 | AMPACET 100329 | 3 | AMPACET 100329 |
|  | 3 | AMPACET 100342 | 3 | AMPACET 100342 | 3 | AMPACET 100342 |
| Total | 100 |  | 100 |  | 100 |  |
| Layer 2 | 97 | Engage 8003 | 91 | Engage 8003 | 85 | Engage 8003 |
|  | 3 | TOPAS 8007 | 9 | TOPAS 8007 | 15 | TOPAS 8007 |
| Total | 100 |  | 100 |  | 100 |  |
| Layer 3 | 97 | ENGAGE 8003 | 91 | ENGAGE 8003 | 85 | ENGAGE 8003 |
|  | 3 | TOPAS 8007 | 9 | TOPAS 8007 | 15 | TOPAS 8007 |
| Total | 100 |  | 100 |  | 100 |  |
| Layer 4 | 97 | ENGAGE 8003 | 91 | ENGAGE 8003 | 85 | ENGAGE 8003 |
|  | 3 | TOPAS 8007 | 9 | TOPAS 8007 | 15 | TOPAS 8007 |
| Total | 100 |  | 100 |  | 100 |  |
| Layer 5 | 91 | ENGAGE 8003 | 85 | ENGAGE 8003 | 79 | ENGAGE 8003 |
|  | 3 | TOPAS 8007 | 9 | TOPAS 8007 | 15 | TOPAS 8007 |
|  | 3 | AMPACET 100329 | 3 | AMPACET 100329 | 3 | AMPACET 100329 |
|  | 3 | AMPACET 100342 | 3 | AMPACET 100342 | 3 | AMPACET 100342 |
| Total | 100 |  | 100 |  | 100 |  |
| Overall | Amt. wt % | Thickness mil | Amt. wt % | Thickness mil | Amt. wt % | Thickness mil |
| Layer 1 | 30 | 1.8 | 30 | 1.8 | 30 | 1.8 |
| Layer 2 | 10 | 0.6 | 10 | 0.6 | 10 | 0.6 |
| Layer 3 | 20 | 1.2 | 20 | 1.2 | 30 | 1.8 |
| Layer 4 | 10 | 0.6 | 10 | 0.6 | 10 | 0.6 |
| Layer 5 | 30 | 1.8 | 30 | 1.8 | 20 | 1.2 |
| Total | 100 | 5.9 | 100 | 5.9 | 100 | 5.9 |
| Die Size, in |  | 2.95 |  | 2.95 |  | 2.95 |
| Film Gauge, mil |  | 5.9 |  | 5.9 |  | 5.9 |
| Layflat, in width |  | 14 |  | 14 |  | 14 |
| BUR |  | 3.0 |  | 3.0 |  | 3.0 |
| Die gap, mil |  | 78.7 |  | 78.7 |  | 78.7 |

TABLE 7D

|  | POE1 with COC @ 10 wt % (Inv. F2) | | POE1 with PBE (Comp. F9) Total Gauge | | POE1 with PBE (Comp. F10) | |
| --- | --- | --- | --- | --- | --- | --- |
|  | 6.5 Amt. wt % | mil Component | 6 Amt. wt % | Mil Component | 6 Amt. wt % | mil Component |
| Layer 1 | 84 | ENGAGE 8003 | 90 | AFFINITY 8770 | 80 | AFFINITY 8770 |
|  | 10 | TOPAS 8007 |  |  | 10 | LDPE 1321 |
|  | 3 | AMPACET 100329 | 5 | AMPACET 10090 | 5 | AMPACET 10090 |
|  | 3 | AMPACET 100342 | 5 | AMPACET 100450 | 5 | AMPACET 100450 |
| Total | 100 |  | 100 |  | 100 |  |
| Layer 2 | 90 | ENGAGE 8003 | 100 | AFFINITY 8770 | 90 | AFFINITY 8770 |
|  | 10 | TOPAS 8007 |  |  | 10 | LDPE 1321 |
| Total | 100 |  | 100 |  | 100 |  |

TABLE 7D-continued

| Layer 3 | 90 | ENGAGE 8003 | 100 | VERSIFY 2200 | 100 | VERSIFY 2200 |
|---|---|---|---|---|---|---|
|  | 10 | TOPAS 8007 | 0 |  | 0 |  |
| Total | 100 |  | 100 |  | 100 |  |
| Layer 4 | 90 | ENGAGE 8003 | 100 | AFFINITY 8770 | 90 | AFFINITY 8770 |
|  | 10 | TOPAS 8007 | 0 |  | 10 | LDPE 1321 |
| Total | 100 |  | 100 |  | 100 |  |
| Layer 5 | 84 | ENGAGE 8003 | 90 | AFFINITY 8770 | 80 | AFFINITY 8770 |
|  | 10 | TOPAS 8007 | 0 |  | 10 | LDPE 1321 |
|  | 3 | AMPACET 100329 | 5 | AMPACET 10090 | 5 | AMPACET 10090 |
|  | 3 | AMPACET 100342 | 5 | AMPACET 100450 | 5 | AMPACET 100450 |
| Total | 100 |  | 100 |  | 100 |  |

| Overall | Amt. wt % | Thickness mil | Amt. wt % | Thickness mil | Amt. wt % | Thickness mil |
|---|---|---|---|---|---|---|
| Layer 1 | 30 | 1.95 | 20 | 1.2 | 20 | 1.2 |
| Layer 2 | 10 | 0.65 | 15 | 0.9 | 15 | 0.9 |
| Layer 3 | 20 | 1.3 | 30 | 1.8 | 30 | 1.8 |
| Layer 4 | 10 | 0.65 | 15 | 0.9 | 15 | 0.9 |
| Layer 5 | 30 | 1.95 | 20 | 1.2 | 20 | 1.2 |
| Total | 100 | 6.5 | 100 | 6 | 100 | 6 |
| Die Size, in |  | 2.95 |  | 2.95 |  | 2.95 |
| Film Gauge, mil |  | 6.5 |  | 6 |  | 6 |
| Layflat, in width |  | 14 |  | 14 |  | 14 |
| BUR |  | 3.0 |  | 3.0 |  | 3.0 |
| Die gap, mil |  | 78.7 |  | 78.7 |  | 78.7 |

TABLE 7E

|  | POE1 with PBE (Comp. F11) | |
|---|---|---|
| Total Gauge | 6 | Mil |
| Layer 1 | Amt. wt % | Component |
|  | 86 | ENGAGE 8003 |
|  | 7 | AMPACET 100329 |
|  | 7 | AB |
| Total | 100 |  |
| Layer 2 | Amt. wt % | Component |
|  | 100 | ENGAGE 8003 |
| Total | 100 |  |
| Layer 3 | Amt. wt % | Component |
|  | 100 | VERSIFY 2200 |
| Total | 100 |  |
| Layer 4 | Amt. wt % | Component |
|  | 100 | ENGAGE 8003 |
| Total | 100 |  |
| Layer 5 | Amt. wt % | Component |
|  | 86 | ENGAGE 8003 |
|  | 7 | AMPACET 100329 |
|  | 7 | AB |
| Total | 100 |  |
| Overall | Amt. wt % | Thickness mil |
| Layer 1 | 20 | 1.2 |
| Layer 2 | 15 | 0.9 |
| Layer 3 | 30 | 1.8 |
| Layer 4 | 15 | 0.9 |
| Layer 5 | 20 | 1.2 |
| Total | 100 | 6 |
| Die Size, in |  | 2.95 |
| Film Gauge, mil |  | 6 |
| Layflat, in width |  | 14 |
| BUR |  | 3.0 |
| Die gap, mil |  | 78.7 |

TABLE 7F

|  | POE1 with COC @ 10% (Inv. F4 (collapsed bubble)) | | POE1 with COC @ 10% (Inv. F5 | |
|---|---|---|---|---|
| Total Gauge | 2.85 | mil | 5.7 | mil |
| Layer 1 (inner layer) | Amt. wt % | Component | Amt. wt % | Component |
|  | 100% | Engage 8003 | 85% | ENGAGE 8003 |
|  |  |  | 10% | TOPAS 8007 |
|  |  |  | 2% | AB |
|  |  |  | 3% | AMPACET 10090 |
| Total | 100 |  | 100 |  |
| Layer 2 | Amt. wt % | Component | Amt. wt % | Component |
|  | 91% | Engage 8003 | 85% | ENGAGE 8003 |

TABLE 7F-continued

| Total | POE1 with COC @ 10% (Inv. F4 (collapsed bubble)) | | POE1 with COC @ 10% (Inv. F5) | |
|---|---|---|---|---|
| Total Gauge | 2.85 | mil | 5.7 | mil |
| | 9% | TOPAS 8007 | 10% | TOPAS 8007 |
| | | | 2% | AB |
| | | | 3% | AMPACET 10090 |
| Total Layer 3 | 100 Amt. wt % | Component | 100 Amt. wt % | Component |
| | 91% | ENGAGE 8003 | 100% | ENGAGE 8003 |
| | 9% | TOPAS 8007 | | |
| Total Layer 4 | 100 Amt. wt % | Component | 100 Amt. wt % | Component |
| | 85% | Engage 8003 | 85% | ENGAGE 8003 |
| | 10% | TOPAS 8007 | 10% | TOPAS 8007 |
| | 2% | AB | 2% | AB |
| | 3% | AMPACET 10090 | 3% | AMPACET 10090 |
| Total Layer 5 | 100 Amt. wt % | Component | 100 Amt. wt % | Component |
| | 85% | Engage 8003 | 85% | ENGAGE 8003 |
| | 10% | TOPAS 8007 | 10% | TOPAS 8007 |
| | 2% | AB | 2% | AB |
| | 3% | AMPACET 10090 | 3% | AMPACET 10090 |
| Total Overall | 100 Amt. wt % | Thickness mil | 100 Amt. wt % | Thickness mil |
| Layer 1 | 14% | 0.40 | 30% | 1.71 |
| Layer 2 | 15% | 0.43 | 13% | 0.741 |
| Layer 3 | 38% | 1.08 | 14% | 0.798 |
| Layer 4 | 13% | 0.37 | 13% | 0.741 |
| Layer 5 | 20% | 0.57 | 30% | 1.71 |
| Total | 100% | 2.85 | 100% | 5.7 |
| Die Size, in | | 2.95 | | 2.95 |
| Film Gauge, mil | | 2.85 | | 5.7 |
| Layflat, in width | | 14 | | 14 |
| BUR | | 3.0 | | 3.0 |
| Die gap, mil | | 78.7 | | 78.7 |

TABLE 8

| Total | POE1 with COC @ 10 wt % (Inv. F3) | | POE1 with PBE (Comp. F12) | |
|---|---|---|---|---|
| Total Gauge | 5.7 | mil | 6 | mil |
| Layer 1 | Amt. wt % | Component | Amt. wt % | Component |
| | 84 | ENGAGE 8003 | 86 | ENGAGE 8003 |
| | 3 | AMPACET 100329 | 7 | AMPACET 100329 |
| | 3 | AMPACET 100342 | 7 | |
| | 10 | TOPAS 8007 | | |
| Total Layer 2 | 100 Amt. wt % | Component | 100 Amt. wt % | Component |
| | 90 | ENGAGE 8003 | 86 | ENGAGE 8003 |
| | 10 | TOPAS 8007 | 7 | AMPACET 100329 |
| | | | 7 | AMPACET 100342 |
| Total Layer 3 | 100 Amt. wt % | Component | 100 Amt. wt % | Component |
| | 90 | ENGAGE 8003 | 100 | VERSIFY 2200 |
| | 10 | TOPAS 8007 | | |
| Total Layer 4 | 100 Amt. wt % | Component | 100 Amt. wt % | Component |
| | 90 | ENGAGE 8003 | 100 | VERSIFY 2200 |
| | 10 | TOPAS 8007 | 0 | |
| Total Layer 5 | 100 Amt. wt % | Component | 100 Amt. wt % | Component |
| | 90 | ENGAGE 8003 | 100 | VERSIFY 2200 |
| | 10 | TOPAS 8007 | | |
| Total Layer 6 | 100 Amt. wt % | Component | 100 Amt. wt % | Component |
| | 90 | ENGAGE 8003 | 86 | ENGAGE 8003 |
| | 10 | TOPAS 8007 | 7 | AMPACET 100329 |
| | | | 7 | AMPACET 100342 |
| Total Layer 7 | 100 Amt. wt % | Component | 100 Amt. wt % | Component |
| | 84 | ENGAGE 8003 | 86 | ENGAGE 8003 |
| | 3 | AMPACET 100329 | 7 | AMPACET 100329 |
| | 3 | AMPACET 100342 | 7 | AMPACET 100342 |
| | 10 | TOPAS 8007 | | |
| Total | 100 | | 100 | |

TABLE 9

| Overall | POE1 with COC @ 10 wt % (Inv. F3) | | POE1 with PBE (Comp. F12) | |
|---|---|---|---|---|
| | Amt. wt % | Thickness mil | Amt. wt % | Thickness mil |
| Layer 1 | 15 | 0.855 | 15 | 0.9 |
| Layer 2 | 15 | 0.855 | 20 | 1.2 |
| Layer 3 | 15 | 0.855 | 10 | 0.6 |
| Layer 4 | 10 | 0.57 | 10 | 0.6 |

TABLE 9-continued

|  | POE1 with COC @ 10 wt % (Inv. F3) | | POE1 with PBE (Comp. F12) | |
|---|---|---|---|---|
| Overall | Amt. wt % | Thickness mil | Amt. wt % | Thickness mil |
| Layer 5 | 15 | 0.855 | 10 | 0.6 |
| Layer 6 | 15 | 0.855 | 20 | 1.2 |
| Layer 7 | 15 | 0.855 | 15 | 0.9 |
| Total | 100 | 5.7 | 100 | 6 |
| Operation Instructions | | | | |
| Die Size, in | | 9.84 | | 9.84 |
| Film Gauge, mil | | 5.7 | | 6 |
| BUR | | 3.5 | | 3.5 |
| Layflat, in width | | 54.1 | | 54.1 |
| Net Layflat, in | | 54 | | 54 |
| Die gap, mil | | 78.7 | | 78.7 |

Summary of Results

Complete mixing in the case of polymeric components in such formulations has been correlated with the high flowability, which results after a material transition, such as melting or glass transition. New compositions have been developed that fulfill a series of temperature dependent constraints, to provide good flowability and high stiffness at ambient temperatures, for adequate transportation of the bagged material. The good flowability allows for ready dispersion of the composition at temperatures in the range from 90° C. to 150° C., and for high hot tack, at sealing temperatures, during packaging operations (>100° C.).

It has been discovered that compositions containing an ethylene-based polymer and a cycloolefin interpolymer that have overlapping transition temperatures in the 70-100 C range have excellent processing properties, dispersion properties and tensile properties, and can be used to form films with excellent physical properties. The inventive compositions have good flowability and therefore good mixing of a final film formulation.

It has also been discovered that such compositions provides an optimization of the tensile properties, as well as processing time. The processing time is the time required for the composition to cool below its transition temperature, and therefore recover the typical properties of a solid-like material. In the case of olefin-based polymers, crystallinity is typically varied to tailor melting behavior, tensile properties, and processing time, however, the inventive compositions do not completely rely on crystallinity to have superior physical properties. For example, both tensile properties and fast processing time benefit from maximizing crystallinity, while good dispersion and fast mixing benefit from low crystallinity. It has been discovered that the inventive compositions have an optimal balance of the ethylene-based polymer (POE) and the cycloolefin interpolymer (COC) to provide an optimal balance between flowability and modulus.

TABLE 10A

|  |  |  | EVA1 Comp. F1 | EVA2 Comp. F2 | EVA3 Comp. F3 | POE1 Comp. F4 | POE2 Comp. F5 | POE3 Comp. F6 |
|---|---|---|---|---|---|---|---|---|
|  | Average Density | — | 0.9408 | 0.9397 | 0.9396 | 0.8878 | 0.9102 | 0.8998 |
|  | Average Flow Rate, I2 @190 C. | Units vary | 2.8 | 1.4 | 1.0 | 0.9 | 1.0 | 1.7 |
| Puncture | Avg-Break Load | lbf | 28 | 32 | 35 | 14 | 15 | 13 |
|  | Avg-Elongation At Break | in | 5.7 | 5.4 | 5.9 | 4.2 | 3.3 | 3.5 |
|  | Avg-Energy To Break | in*lbf | 102 | 108 | 124 | 55 | 47 | 49 |
|  | Avg-Peak Load | lbf | 29 | 32 | 35 | 21 | 21 | 21 |
|  | Avg-Puncture | ft*lbf/in^3 | 111 | 116 | 136 | 56 | 48 | 50 |
| Secant Modulus - CD | Avg-Modulus | psi | 6572 | 6206 | 6027 | 4189 | 8393 | 7158 |
|  | Avg-Secant Modulus At 1% | psi | 6283 | 6240 | 6043 | 4213 | 8425 | 7176 |
|  | Avg-Secant Modulus At 2% | psi | 5978 | 6170 | 5932 | 4165 | 8306 | 7093 |
| Secant Modulus - MD | Avg-Modulus | psi | 6622 | 6264 | 5630 | 60898 | 8162 | 7545 |
|  | Avg-Secant Modulus At 1% | psi | 6404 | 6293 | 5661 | 3978 | 8280 | 7498 |
|  | Avg-Secant Modulus At 2% | psi | 6063 | 6203 | 5593 | 4040 | 8099 | 7407 |
| Tensile - Film - CD | Avg-Break Stress | psi | 2538 | 1082 | 979 | 4497 | 1073 | 1095 |
|  | Avg-Energy Per Volume At Break | ft*lbf/in^3 | 874 | 260 | 235 | 785 | 253 | 282 |
|  | Avg-Energy To Break | in*lbf | 124 | 39 | 37 | 127 | 41 | 43 |

TABLE 10A-continued

|  |  |  | EVA1 Comp. F1 | EVA2 Comp. F2 | EVA3 Comp. F3 | POE1 Comp. F4 | POE2 Comp. F5 | POE3 Comp. F6 |
|---|---|---|---|---|---|---|---|---|
|  | Avg-Peak Load | lbf | 15 | 7 | 6 | 30 | 7 | 7 |
|  | Avg-Strain At Break | % | 830 | 369 | 363 | 680 | 335 | 367 |
|  | Avg-Strain At Yield | % | 24 | 19 | 20 | 18 | 16 | 19 |
|  | Avg-Stress At Yield | psi | 562 | 595 | 540 | 425 | 624 | 662 |
| Tensile - Film - MD | Avg-Break Stress | psi | 3186 | 1074 | 1102 | 4085 | 1123 | 1072 |
|  | Avg-Energy Per Volume At Break | ft*lbf/in^3 | 1055 | 224 | 252 | 725 | 259 | 262 |
|  | Avg-Energy To Break | in*lbf | 148 | 31 | 37 | 111 | 41 | 42 |
|  | Avg-Peak Load | lbf | 18 | 6 | 7 | 26 | 8 | 7 |
|  | Avg-Strain At Break | % | 869 | 307 | 351 | 633 | 329 | 342 |
|  | Avg-Strain At Yield | % | 20 | 19 | 20 | 20 | 17 | 19 |
|  | Avg-Stress At Yield | psi | 539 | 609 | 560 | 445 | 654 | 668 |
|  | Avg VICAT | C.- | 61 | 65 | 65 | 69 | 81 | 79 |
|  | Thickness | mil | 6.0 | 6.0 | 6.2 | 6.4 | 6.5 | 6.5 |

TABLE 10B

|  | Result | Units | POE1 with COC @3% Comp. F7 | POE1 with COC @9% Inv. F1 | POE1 with COC @15% Comp. F8 | POE1 with COC @10% Inv. F2 | POE1 with COC @10% Inv. F3 |
|---|---|---|---|---|---|---|---|
|  | Average Density | — | — | — | — | 0.8983 | 0.8998 |
|  | Average Flow Rate, I2 @190 C. | Units vary | — | — | — | 0.9 | 0.9 |
| Puncture | Avg-Break Load | lbf | 15 | 15 | 22 | 19 | 26 |
|  | Avg-Elongation at Break | in | 4.4 | 3.8 | 3.1 | 3.5 | 3.8 |
|  | Avg-Energy To Break | in*lbf | 58 | 55 | 42 | 58 | 57 |
|  | Avg-Peak Load | lbf | 22 | 24 | 22 | 26 | 26 |
|  | Avg-Puncture | ft*lbf/in^3 | 67 | 63 | 56 | 58 | 67 |
| Secant Modulus - CD | Avg-Modulus | psi | — | — | — | 9720 | 6435 |
|  | Avg-Secant Modulus At 1% | psi | — | — | — | 9743 | 6489 |
|  | Avg-Secant Modulus At 2% | psi | — | — | — | 9427 | 6383 |
| Secant Modulus - MD | Avg-Modulus | psi | — | — | — | 13786 | 17209 |
|  | Avg-Secant Modulus At 1% | psi | — | — | — | 13778 | 17147 |
|  | Avg-Secant Modulus At 2% | psi | — | — | — | 13337 | 16516 |
| Tensile - Film - CD | Avg-Break Stress | psi | 5219 | 4554 | 4237 | 1118 | 1122 |
|  | Avg-Energy Per Volume At Break | ft*lbf/in^3 | 983 | 958 | 1029 | 209 | 194 |
|  | Avg-Energy To Break | in*lbf | 136 | 133 | 133 | 32 | 26 |
|  | Avg-Peak Load | lbf | 30 | 26 | 23 | 7 | 6 |
|  | Avg-Strain At Break | % | 697 | 646 | 584 | 284 | 267 |
|  | Avg-Strain At Yield | % | 18 | 19 | 22 | 17 | 27 |
|  | Avg-Stress At Yield | psi | 496 | 643 | 890 | 638 | 692 |
| Tensile - Film - MD | Avg-Break Stress | psi | 4863 | 4075 | 3151 | 1203 | 1206 |
|  | Avg-Energy Per Volume At Break | ft*lbf/in^3 | 988 | 888 | 688 | 183 | 133 |
|  | Avg-Energy To Break | in*lbf | 142 | 122 | 113 | 30 | 18 |
|  | Avg-Peak Load | lbf | 29 | 23 | 22 | 8 | 7 |
|  | Avg-Strain At Break | % | 693 | 592 | 444 | 228 | 159 |
|  | Avg-Strain At Yield | % | 20 | 16 | 8 | 10 | 12 |
|  | Avg-Stress At Yield | psi | 519 | 701 | 1074 | 670 | 751 |
|  | Avg VICAT | C.- | 65 | 72 | 71 | 72 | 67 |
|  | Thickness | mil | 5.9 | 5.8 | 5.8 | 6.5 | 5.6 |

TABLE 10C

| | Result | Units | POE1 with PBE Comp. F9 | POE1 with PBE Comp. F10 | POE1 with PBE Comp. F11 | POE1 with PBE Comp. F12 |
|---|---|---|---|---|---|---|
| | Average Density | — | — | — | 0.8882 | 0.8901 |
| | Average Flow Rate, I2 @190 C. | Units vary | — | — | 0.9 | 1.1 |
| Puncture | Avg-Break Load | lbf | 13 | 14 | 17 | 10 |
| | Avg-Elongation At Break | in | 4.8 | 3.9 | 1.3 | 2.2 |
| | Avg-Energy To Break | in*lbf | 64 | 45 | 38 | 16 |
| | Avg-Peak Load | lbf | 22 | 19 | 17 | 11 |
| | Avg-Puncture | ft*lbf/in^3 | 71 | 46 | 44 | 18 |
| Secant Modulus - CD | Avg-Modulus | psi | 7387 | 7984 | 8020 | 7810 |
| | Avg-Secant Modulus At 1% | psi | 7389 | 8005 | 8044 | 7802 |
| | Avg-Secant Modulus At 2% | psi | 7272 | 7866 | 7934 | 7625 |
| Secant Modulus - MD | Avg-Modulus | psi | 7822 | 8405 | 7097 | 7913 |
| | Avg-Secant Modulus At 1% | psi | 7811 | 8436 | 7209 | 7998 |
| | Avg-Secant Modulus At 2% | psi | 7658 | 8274 | 7073 | 7769 |
| Tensile - Film - CD | Avg-Break Stress | psi | 4381 | 3841 | 1329 | 4838 |
| | Avg-Energy Per Volume At Break | ft*lbf/in^3 | 846 | 1223 | 1015 | 894 |
| | Avg-Energy To Break | in*lbf | 132 | 183 | 141 | 124 |
| | Avg-Peak Load | lbf | 29 | 26 | 12 | 28 |
| | Avg-Strain At Break | % | 701 | 812 | 912 | 628 |
| | Avg-Strain At Yield | % | 101 | 710 | 623 | 16 |
| | Avg-Stress At Yield | psi | 707 | 3940 | 2012 | 721 |
| Tensile - Film - MD | Avg-Break Stress | psi | 4935 | 5121 | 1241 | 4255 |
| | Avg-Energy Per Volume At Break | ft*lbf/in^3 | 901 | 1107 | 1063 | 1166 |
| | Avg-Energy To Break | in*lbf | 131 | 153 | 149 | 158 |
| | Avg-Peak Load | lbf | 30 | 28 | 12 | 25 |
| | Avg-Strain At Break | % | 693 | 751 | 912 | 763 |
| | Avg-Strain At Yield | % | 101 | 747 | 593 | 16 |
| | Avg-Stress At Yield | psi | 737 | 4840 | 1991 | 724 |
| | Avg VICAT | C.- | — | — | 67 | 64 |
| | Thickness | mil | 6.2 | 6.3 | 5.9 | 5.7 |

TABLE 10D

| | Result | Units | POE1 with COC @ 10% (Inv. F4) | POE1 with COC @ 10% (Inv. F5) |
|---|---|---|---|---|
| | Average Density | — | 0.8962 | 0.8984 |
| | Average Flow Rate, I2 @ 190 C | Units vary | 1.0 | 1.0 |
| Puncture | Avg-Break Load | lbf | 24 | 24 |
| | Avg-Elongation At Break | in | 4.5 | 4.2 |
| | Avg-Energy To Break | in*lbf | 72 | 69 |
| | Avg-Peak Load | lbf | 26 | 27 |
| | Avg-Puncture | ft*lbf/in^3 | 86 | 82 |
| Tensile- Film-CD | Avg-Break Stress | psi | 4557 | 4341 |
| | Avg-Energy Per Volume At Break | ft*lbf/in^3 | 845 | 864 |
| | Avg-Energy To Break | in*lbf | 119 | 116 |
| | Avg-Peak Load | lbf | 27 | 24 |
| | Avg-Strain At Break | % | 595 | 578 |
| | Avg-Strain At Yield | % | 19 | 19 |
| | Avg-Stress At Yield | psi | 686 | 741 |
| Tensile - Film -MD | Avg-Break Stress | psi | 4910 | 4047 |
| | Avg-Energy Per Volume At Break | ft*lbf/in^3 | 1032 | 880 |
| | Avg-Energy To Break | in*lbf | 134 | 126 |
| | Avg-Peak Load | lbf | 27 | 24 |

TABLE 10D-continued

|  |  | POE1 with COC @ 10% (Inv. F4) | POE1 with COC @ 10% (Inv. F5) |
|---|---|---|---|
| Avg-Strain At Break | % | 594 | 557 |
| Avg-Strain At Yield | % | 17 | 18 |
| Avg-Stress At Yield | psi | 765 | 837 |
| Avg VICAT | C- | 63 | 63 |
| Thickness | mil | 5.9 | 5.6 |

What is claimed is:

1. A film comprising at least five layers a/b/c/d/e, wherein each of the layers a, b, d, and e are formed from a composition comprising the following components:
    A) ≥80 wt %, based on the weight of the composition, of an ethylene/α-olefin copolymer with a density from 0.87 g/cc to 0.885 g/cc and a Tm from 80° C. to 95° C.;
    B) from 9 to 12 wt %, based on the sum weight of the components A and B, of a cycloolefin copolymer comprising, in polymerized form, ethylene and a bridged cyclic olefin consisting of:

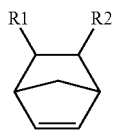

Structure a, wherein R1 and R2 are each, independently, selected from the group consisting of hydrogen and an alkyl;
    C) from 5 wt % to 10 wt % of a slip agent, an anti-block additive or a combination thereof;
    wherein the cycloolefin copolymer of the component B has a Tg from 60° C. to 90° C. and the weight ratio of the component A to the component B is from 4.0 to 10.0 based on the weight of the composition, and
    wherein the composition has a fraction of enthalpy of crystallization above 60° C. relative to the total enthalpy of crystallization measured by DSC (Ec) value of 0.40,
    a rheology ratio (RR) value of 10.0-16.0, a fraction of the enthalpy of melting below 85° C. relative to the total enthalpy of melting measured by DSC (E1) value from 0.84 to 0.92 and a fraction of the enthalpy of melting between Tm and 95° C. relative to the enthalpy of melting above Tm measured by DSC (E2) value from 0.92 to 0.98;
    and the layer c is formed from a composition comprising the following components:
    D) more than 91 wt %, based on the weight of the composition, of an ethylene/α-olefin copolymer that has a density ≤0.885 g/cc and a Tm from 80° C. to 95° C.;
    E) less than 9 wt %, based on the sum weight of the components A and B of a cycloolefin copolymer comprising, in polymerized form, ethylene and a bridged cyclic olefin consisting of

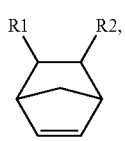

Structure a

Structure a, wherein R1 and R2 are each, independently, selected from the group consisting of hydrogen and an alkyl.

2. The film of claim 1 wherein the film has a thickness from 5 to 6 mil.

3. A wrap or a bag comprising the film of claim 1, and when the wrap or bag contains an enclosed material, the wrap or bag does not need to be stripped off from the enclosed material, during the mixing of the enclosed material.

4. A film comprising at least five layers a/b/c/d/e, wherein the layer a is formed from an ethylene/α-olefin copolymer,
    the layers d and e are formed from a composition comprising of the following components:
    A) ≥80 wt %, based on the weight of the composition of an ethylene/α-olefin copolymer with a density from 0.87 g/cc to 0.885 g/cc and a Tm from 80° C. to 95° C.;
    B) from 9 to 12 wt %, based on the sum weight of the components A and B, of a cycloolefin copolymer comprising, in polymerized form, ethylene and a bridged cyclic olefin consisting of:

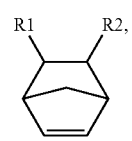

Structure a

Structure a, wherein R1 and R2 are each, independently, selected from the group consisting of hydrogen and an alkyl;
    C) from 5 wt % to 10 wt % of a slip agent, an anti-block additive or a combination thereof;
    wherein the cycloolefin copolymer of the component B has a Tg from 60° C. to 90° C. and the weight ratio of the component A to the component B is from 4.0 to 10.0 based on the weight of the composition, and
    wherein the composition has a fraction of enthalpy of crystallization above 60° C. relative to the total enthalpy of crystallization measured by DSC (Ec) value of 0.40,
    a rheology ratio (RR) value of 10.0-16.0, a fraction of the enthalpy of melting below 85° C. relative to the total enthalpy of melting measured by DSC (E1) value from 0.84 to 0.92 and a fraction of the enthalpy of melting between Tm and 95° C. relative to the enthalpy of melting above Tm measured by DSC (E2) value from 0.92 to 0.98;
    and
    the layers b and c are formed from a composition comprising the following components:
    D) more than 91 wt %, based on the weight of the composition, of an ethylene/α-olefin copolymer that has a density ≤0.885 g/cc and a Tm from 80° C. to 95° C.;

E) less than 9 wt %, based on the sum weight of the components A and B, of a cycloolefin copolymer comprising, in polymerized form, an ethylene and a bridged cyclic olefin consisting of
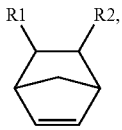
Structure a
Structure a, wherein R1 and R2 are each, independently, selected from the group consisting of hydrogen and an alkyl.
5. The film of claim 4 wherein the film has a thickness from 5 to 6 mil.
* * * * *